(12) United States Patent
Habuta et al.

(10) Patent No.: US 8,247,058 B2
(45) Date of Patent: Aug. 21, 2012

(54) INFORMATION RECORDING MEDIUM AND MANUFACTURING METHOD THEREOF

(75) Inventors: Haruhiko Habuta, Osaka (JP); Noboru Yamada, Osaka (JP); Shigeru Furumiya, Hyogo (JP)

(73) Assignee: Panasonic Corporation, Osaka (JP)

( * ) Notice: Subject to any disclaimer, the term of this patent is extended or adjusted under 35 U.S.C. 154(b) by 340 days.

(21) Appl. No.: 12/741,918

(22) PCT Filed: May 15, 2009

(86) PCT No.: PCT/JP2009/002159
§ 371 (c)(1),
(2), (4) Date: May 7, 2010

(87) PCT Pub. No.: WO2010/032348
PCT Pub. Date: Mar. 25, 2010

(65) Prior Publication Data
US 2010/0260035 A1   Oct. 14, 2010

(30) Foreign Application Priority Data
Sep. 18, 2008 (JP) ................... 2008-239122

(51) Int. Cl.
*B32B 3/02* (2006.01)
(52) U.S. Cl. ............ 428/64.1; 428/64.4; 428/64.5; 430/270.13
(58) Field of Classification Search ............ 428/64.4, 428/64.5; 430/270.11
See application file for complete search history.

(56) References Cited

U.S. PATENT DOCUMENTS

| 2005/0078594 A1 | 4/2005 | Takahashi et al. |
| 2005/0122887 A1 | 6/2005 | Abe |
| 2009/0239022 A1 | 9/2009 | Habuta et al. |

FOREIGN PATENT DOCUMENTS

| EP | 2 079 082 | 7/2009 |
| JP | 2005-135569 | 5/2005 |
| JP | 2005-196940 | 7/2005 |
| JP | 2007-280518 | 10/2007 |
| JP | 2008-41164 | 2/2008 |
| JP | 2008-117470 | 5/2008 |
| WO | 2007/123230 | 11/2007 |

OTHER PUBLICATIONS

International Search Report issued Jun. 9, 2009 in International (PCT) Application No. PCT/JP2009/002159.

*Primary Examiner* — Elizabeth Mulvaney
(74) *Attorney, Agent, or Firm* — Wenderoth, Lind & Ponack, L.L.P.

(57) ABSTRACT

An information recording medium (9) comprises an information layer (9a) in which concavo-convex marks are formed, and a recording layer (13), contained within the information layer (9a), in which added marks are formed by optical properties changing through laser irradiation, and that contains Te, O, and M (where M is at least one element selected from a group consisting of Pd, Au, Pt, Ag, Cu, and Ni). In this information recording medium (9), a pre-laser irradiation reflectance Ra and a post laser irradiation reflectance Rb fulfill $1.0 < Rb/Ra < 1.1$.

14 Claims, 6 Drawing Sheets

FIG. 8

INFORMATION RECORDING MEDIUM AND MANUFACTURING METHOD THEREOF

TECHNICAL FIELD

The present invention relates to an information recording medium to and from which information can be recorded and reproduced using an optical method such as irradiation with a laser beam (laser light), and particularly relates to an information recording medium to which main information such as video, audio, and the like can be recorded and sub information can be added.

BACKGROUND ART

Optical information recording media as exemplified by DVD (Digital Versatile/Video Disc) and Blu-Ray discs are known as high-capacity information recording media (also called "recording media" or simply "media") capable of high-speed information recording and reproduction. Information is recorded to and reproduced from such information recording media by using differences in the reflectances among two differing states. Because such information recording media are capable of random access as necessary and also have the advantage of being highly portable, the importance thereof has been increasing significantly in recent years.

Rewritable media capable of being rewritten multiple times, write-once media capable of being written to only once, and read-only media capable only of being reproduced can be given as types of information recording media proposed thus far. Generally speaking, a read-only medium can be composed of fewer layers than a rewritable medium or a write-once medium, making the manufacture thereof easy, and making it possible to provide such a medium at low cost. For this reason, read-only media are widely used in the distribution of digital content such as music, video, video game software, and the like.

In read-only media, sub information such as the serial number of the information recording medium is added separately from the video, music, or the like that makes up the main information in order to prevent unauthorized copying. This sub information is recorded, for example, as a barcode-shaped mark called a BCA (Burst Cutting Area) that is formed by burning a reflective layer within the information recording layer using a YAG laser.

Patent Citation 1: JP 2005-196940A

SUMMARY OF INVENTION

Technical Problem

However, there is a problem in that because a high-cost YAG laser is necessary to record the sub information, the cost of manufacturing the information recording media increases.

Having been achieved in order to solve the problem with the aforementioned invention, it is an object of the present invention to provide an information recording medium to which main information such as video, audio, and the like can be recorded and to which sub information can be added at a low cost.

Technical Solution

In order to achieve the aforementioned object, an information recording medium according to a first aspect of the present invention comprises the following (1) through (3): (1) an information layer in which concavo-convex marks are formed; (2) a recording layer, contained within the information layer, in which added marks are formed by optical properties changing through laser irradiation, and that contains Te, O, and M (where M is at least one element selected from a group consisting of Pd, Au, Pt, Ag, Cu, and Ni); and (3) a substrate on which the information layer is disposed. A pre-laser irradiation reflectance Ra and a post-laser irradiation reflectance Rb of the information recording medium fulfill $1.0 < Rb/Ra < 1.1$.

This information recording medium is capable of recording main information such as video, audio, and the like as concavo-convex marks, and recording sub information as added marks. Therefore, this information recording medium is capable of suppressing an increase in the cost of manufacturing the information recording medium, and also excels in terms of convenience.

An information recording medium according to a second aspect of the present invention is the information recording medium according to the first aspect, in which the shortest distance between adjacent added marks is longer than the longest distance between adjacent concavo-convex marks; and the length of the shortest added mark is longer than the length of the longest concavo-convex mark. With the information recording medium according to the second aspect, it is possible to reproduce data recorded as concavo-convex marks and data recorded as added marks in a stable manner.

An information recording medium according to a third aspect of the present invention is the information recording medium according to the first or second aspect, in which when the total of the number of Te atoms, O atoms, and M atoms contained in the recording layer is taken as 100 atomic %, the content percentage of Te atoms is no less than 10 atomic % and no more than 65 atomic %; the content percentage of O atoms is no less than 20 atomic % and no more than 75 atomic %; and the content percentage of M atoms is no less than 1 atomic % and no more than 30 atomic %. The information recording medium according to the third aspect is suited to the stable reproduction of signals over a long period of time.

An information recording medium according to a fourth aspect of the present invention is the information recording medium according to the first or second aspect, in which when the total of the number of Te atoms, O atoms, and M atoms contained in the recording layer is taken as 100 atomic %, the content percentage of Te atoms is no less than 20 atomic % and no more than 50 atomic %; the content percentage of O atoms is no less than 40 atomic % and no more than 65 atomic %; and the content percentage of M atoms is no less than 1 atomic % and no more than 20 atomic %. The information recording medium according to the fourth aspect is further suited to the stable reproduction of signals over a long period of time.

An information recording medium according to a fifth aspect of the present invention is the information recording medium according to one of the first through fourth aspects, in which when the total number of atoms that compose the recording layer is taken as 100 atomic %, the total of the number of Te atoms, O atoms, and M atoms contained in the recording layer is no less than 80 atomic %.

If the total of the number of Te atoms, O atoms, and M atoms is no less than 80 atomic %, the effects achieved by including O atoms, Te atoms, and M atoms can be achieved more dramatically. It is further preferable for the total of the number of Te atoms, O atoms, and M atoms to be no less than 90 atomic %, and even further preferable for that number to be no less than 95 atomic %. Alternatively, the recording layer may be formed solely of Te atoms, O atoms, and M atoms.

An information recording medium according to a sixth aspect of the present invention is the information recording medium according to one of the first through fifth aspects, in which the information layer includes a dielectric layer adjacent to the recording layer; and it is further preferable for the dielectric layer to have, as its primary component, at least one item selected from a group consisting of a sulfide material, a selenide material, an oxide material, a nitride material, a nitride oxide material, a carbide material, and a fluoride material.

By having such a composition, the information recording medium according to the sixth aspect invention is suited to the stable reproduction of signals over a long period of time resulting from the combination with a recording layer containing specific elements (Te atoms, O atoms, and M atoms).

An information recording medium according to a seventh aspect of the present invention is the information recording medium according to one of the first through sixth aspects, in which the information layer includes a dielectric layer adjacent to the recording layer; and the thickness of the dielectric layer is no less than 2 nm and no more than 100 nm. An information recording medium having a favorable reflectance for the stable reproduction of signals is realized by having the thickness of the dielectric layer within that range.

An information recording medium according to an eighth aspect of the present invention is the information recording medium according to one of the first through sixth aspects, in which the information layer includes a dielectric layer adjacent to the recording layer; and the thickness of the dielectric layer is no less than 2 nm and no more than 50 nm. An information recording medium having a further favorable reflectance for the stable reproduction of signals is realized by having the thickness of the dielectric layer within that range.

An information recording medium according to a ninth aspect of the present invention is the information recording medium according to one of the first through eighth aspects, in which the information layer includes a reflective layer disposed between the substrate and the recording layer; and the reflective layer contains, as its primary component, at least one element selected from a group consisting of Ag, Al, Au, Cu, Ni, Cr, and Ti. According to the information recording medium of the ninth aspect of the present invention, an information recording medium having a reflectance that is preferable for the stable reproduction of signals is realized.

An information recording medium according to a tenth aspect of the present invention is the information recording medium according to one of the first through ninth aspects, in which the information layer includes a reflective layer disposed between the substrate and the recording layer; and the thickness of the reflective layer is no less than 5 nm and no more than 200 nm. An information recording medium having a reflectance that is preferable for the stable reproduction of signals is realized by having the thickness of the reflective layer within that range.

An information recording medium according to an eleventh aspect of the present invention is the information recording medium according to one of the first through tenth aspects, in which the thickness of the recording layer is no less than 2 nm and no more than 60 nm. An information recording medium having a reflectance that is preferable for the stable reproduction of signals is realized by having the thickness of the recording layer within that range.

An information recording medium according to a twelfth aspect of the present invention is the information recording medium according to one of the first through tenth aspects, in which the thickness of the recording layer is no less than 2 nm and no more than 40 nm. An information recording medium having a reflectance that is further preferable for the stable reproduction of signals is realized by having the thickness of the recording layer within that range.

A manufacturing method according to a thirteenth aspect of the present invention is a method of manufacturing the aforementioned information recording medium, the method including a step of forming a recording layer directly upon the substrate or upon another layer that is formed upon the substrate by sputtering with a sputtering target that contains Te, O, and M (where M is at least one element selected from a group consisting of Pd, Au, Pt, Ag, Cu, and Ni). According to this manufacturing method, an information recording medium capable of stably reproducing signals over a long period of time can be manufactured.

Furthermore, a manufacturing method according to a fourteenth aspect of the present invention is a method of manufacturing the aforementioned information recording medium, the method including a step of forming a recording layer directly upon the substrate or upon another layer that is formed upon the substrate by reactive sputtering with a sputtering target that contains Te and M (where M is at least one element selected from a group consisting of Pd, Au, Pt, Ag, Cu, and Ni) in a mixed gas atmosphere that contains a noble gas and oxygen. This method makes it possible to manufacture an information recording medium capable of reproducing a signal in a stable manner over a long period of time.

Advantageous Effects

The information recording medium of the present invention is capable of having main information such as video, audio, and the like recorded thereto, and is furthermore capable of having sub information added thereto at a low cost.

In addition, according to a method for manufacturing a n information recording medium according to the present invention, an information recording medium having the aforementioned effects can be manufactured.

DETAILED DESCRIPTION OF THE EMBODIMENTS

Hereinafter, embodiments of the present invention shall be described with reference to the drawings. Note, however, that the present invention is not limited to the working examples described hereinafter. Furthermore, in the following, there are cases where identical portions or elements are given identical reference numerals and redundant descriptions thereof are omitted.

1. Information Recording Medium 1-1. Layout Structure

Figure 1:
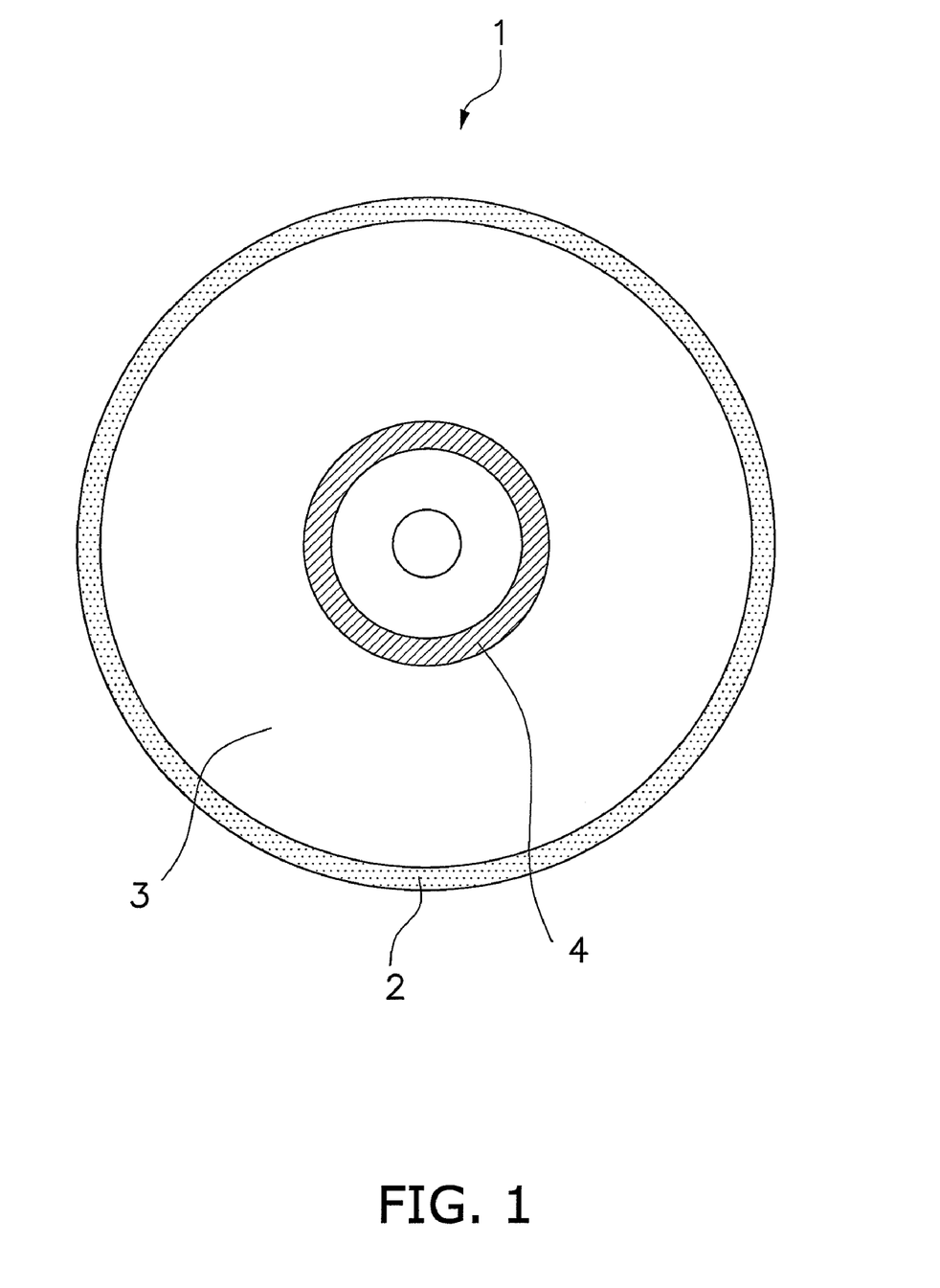
FIG. 1 is a plan view schematically illustrating the configuration of an information recording medium.

FIG. 1 is a plan view illustrating an example of the disk layout structure of an information recording medium 1.

As shown in FIG. 1, the information recording medium 1 is a round recording disk. The information recording medium 1 has a lead-in area 4, a data recording area 3, and a lead-out area 2.

Information regarding the structure of the disk, information necessary when recording to the disk, data regarding management information of recorded data, and the like are recorded into the lead-in area 4 through concavo-convex marks.

The lead-out area 2 is an area indicating the recording end position of the data.

The main information of the medium is recorded in the data recording area 3 through concavo-convex marks. Video, audio, and other software can be given as examples of the main information.

Figure 2:
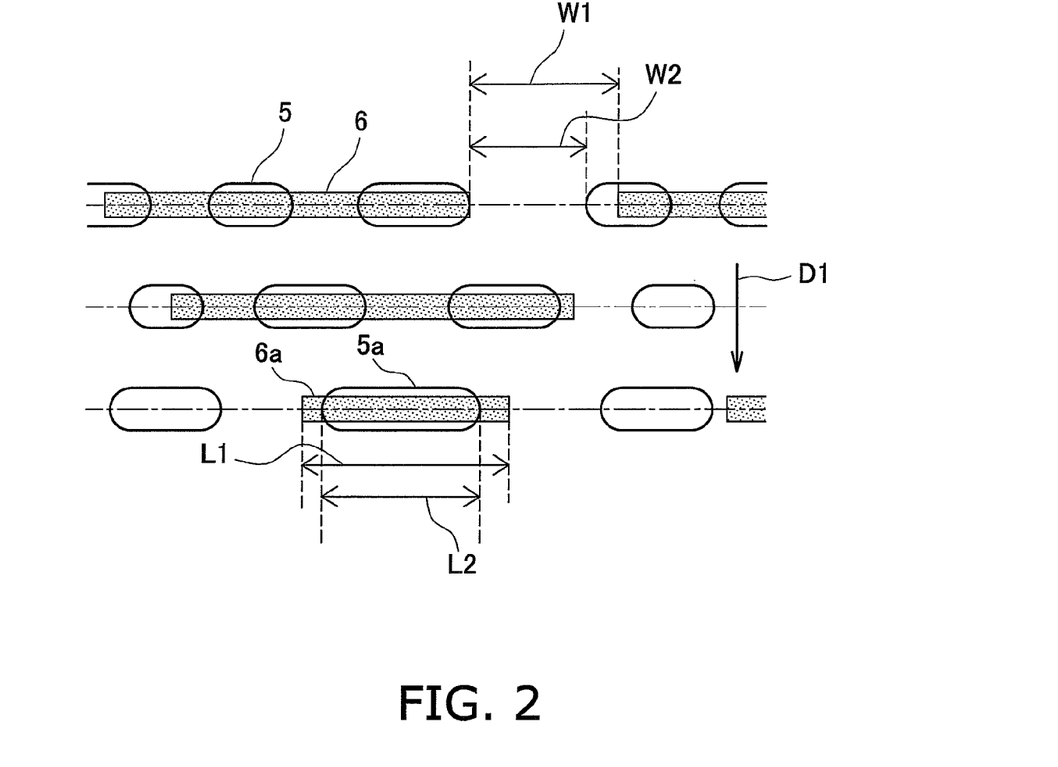
FIG. 2 is a schematic diagram illustrating concavo-convex data and added data in an information recording medium.
Figure 3:
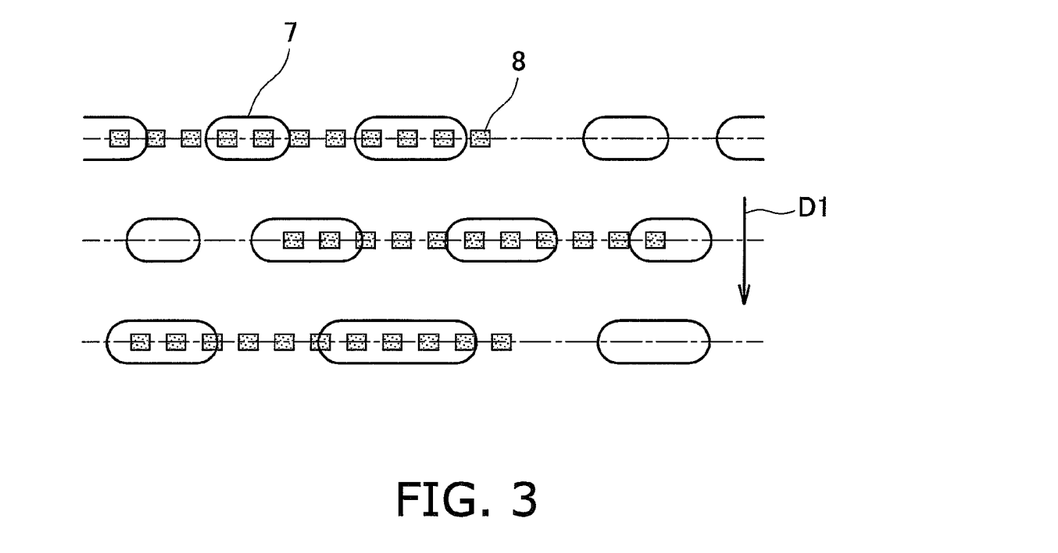
FIG. 3 is a schematic diagram illustrating concavo-convex data and other added data in an information recording medium.

With the information recording medium 1, information unique to that information recording medium, such as a serial number or the like, can be recorded as sub information through laser irradiation. The sub information is recorded as added marks that overlap the concavo-convex marks. Although it is preferable for the sub information to be locally recorded in the lead-in area 4, the sub information can be recorded into an area aside from the lead-in area 4 (for example, the data recording area 3 or the like). Concavo-convex marks 5 and added marks 6 shown in FIG. 2 are examples of concavo-convex marks and added marks formed in the information recording medium 1, and concavo-convex marks 7 and added marks 8 shown in FIG. 3 are other examples thereof. In other words, the concavo-convex marks and added marks formed in the information recording medium 1 may be configured as shown in FIG. 2 or FIG. 3. In FIG. 2 and FIG. 3, the radial direction of the information recording medium 1 is indicated by D1.

The added marks 6 are formed on the concavo-convex marks 5 through irradiation with a laser beam. As shown in FIG. 2, the intervals between the added marks 6 (that is, the distance between added marks 6 that are adjacent in the circumferential direction of the information recording medium 1) are longer than the longest mark interval of the concavo-convex marks 5 (that is, the longest distance between marks that are adjacent in the circumferential direction of the information recording medium 1). The shortest distance W1 between adjacent added marks 6 is longer than the longest distance W2 between adjacent concavo-convex marks 5.

Furthermore, the lengths of the added marks 6 are greater than the lengths of the concavo-convex marks 5. In FIG. 2, a reference numeral "6a" is added to the shortest added mark 6, and a reference numeral "5a" is added to the longest concavo-convex mark 5. As shown in FIG. 2, the length L1 of the added mark 6a is greater than the length L2 of the concavo-convex mark 5a. "Length" refers to the length in the circumferential direction of the information recording medium 1. Although in FIG. 2, the added mark 6a and the concavo-convex mark 5a are illustrated as overlapping one another for the sake of simplicity, the present invention is not limit to the structure shown in FIG. 2.

Figure 7:
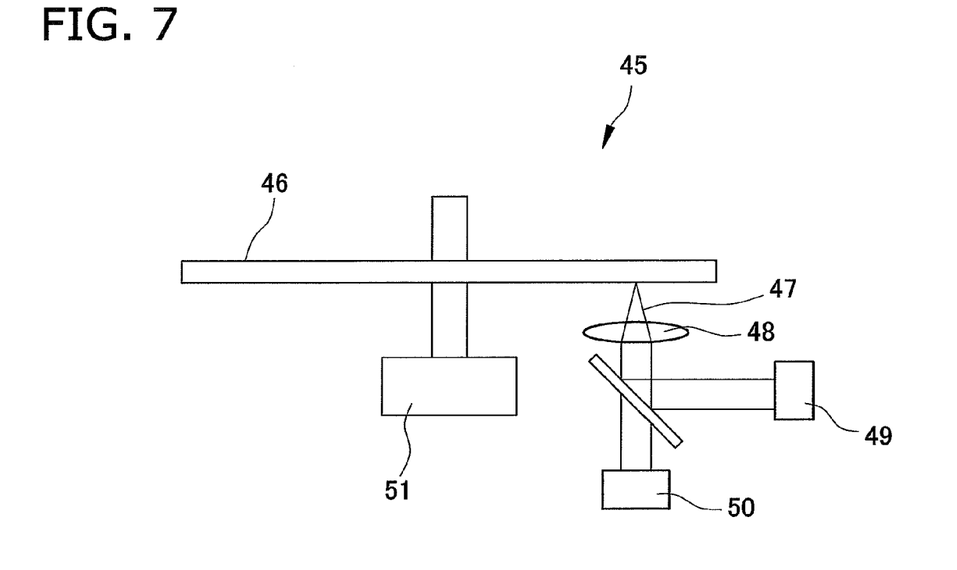
FIG. 7 is a diagram schematically illustrating part of the configuration of a recording and reproduction apparatus used in the recording and reproduction of an information recording medium.

By having the distance W1 longer than the distance W2 and the length L1 longer than the length L2 in such a manner, the data recorded using the concavo-convex marks 5 and the data recorded using the added marks 6 are stably reproduced using, for example, a recording and reproduction apparatus 45 (mentioned later).

However, the lengths and intervals of the added marks are not limited to the form shown in FIG. 2. For example, in the configuration shown in FIG. 3, added marks 8 are formed upon concavo-convex marks 7 through laser beam irradiation in the same manner as the configuration shown in FIG. 2. As shown in FIG. 3, the shortest distance between the added marks 8 may be shorter than the shortest distance between concavo-convex marks 7. In addition, the length of the shortest added mark 8 may be shorter than the length of the longest concavo-convex mark 7.

When an added mark is referred to simply as an "added mark" in the present specification, that added mark may have the form of either the added marks 6 or 8.

1-2. Reflectance

It is preferable for the reflectance of the information recording medium 1 to increase due to laser irradiation. In a normal read-only recording medium, the reflectance decreases due to laser irradiation. As opposed to this, a recording medium whose reflectance increases due to laser irradiation can prevent unauthorized copying.

In addition, it is preferable for the amount of the increase in the reflectance of the information recording medium 1 due to laser irradiation to be minute. In other words, it is preferable for the post-laser irradiation reflectance Rb of the information recording medium 1 to be higher to a degree that still allows the main information recorded into the information recording medium 1 as concavo-convex marks to be reproduced in a stable manner.

To be more specific, it is preferable for the pre-laser irradiation reflectance Ra and the post-laser irradiation reflectance Rb of the information recording medium 1 to fulfill the following relationship:

$$1.0 < Rb/Ra < 1.1$$

The reason for this is that the main information recorded as concavo-convex marks can be reproduced in a stable manner by having Rb/Ra fall within this range. For example, in the case where dust has adhered to the surface of the pickup of a reproduction apparatus that reproduces information recorded onto the information recording medium 1 (for example, the recording and reproduction apparatus 45 described later), the pickup receives a decreased amount of light, and thus the stability of the reproduction of the main information drops. However, by having Rb/Ra fall within the aforementioned range, the reproduction apparatus can reproduce the main information in a stable manner.

Note that a reproduction apparatus can reproduce added marks in a stable manner even in a case such as where the relationship between reflectances fulfills $Rb/Ra \geq 1.1$.

1-3. Modulation Degree

It is preferable for a modulation degree A of the concavo-convex marks and a modulation degree B of the added marks in the information recording medium 1 to fulfill the following:

$$B/A < 0.1$$

By having B/A fall within this range, the reproduction accuracy of the signal recorded as the concavo-convex marks is favorable. In other words, in the reproduced signal, the modulation degree of the added marks is sufficiently small relative to the modulation degree of the concavo-convex marks during reproduction, and therefore degradation in the reproduction accuracy of the concavo-convex marks can be suppressed by having B/A fall within this range.

In addition, it is preferable for the information recording medium 1 to be resistant to degradation caused by laser beam irradiation used for signal reproduction and to maintain a high signal quality over a long period of time. For example, it is preferable for no degradation to arise in the signal quality of the concavo-convex marks and the added marks even after the information recording medium 1 has been irradiated by the laser beam approximately 1 million times.

1-4. Layer Structure

Details of the structure of the information recording medium 1 having the characteristics mentioned in the aforementioned sections 1-2 and 1-3 shall be described hereinafter. Information recording media 9, 17, and 29, illustrated in FIGS. 4 through 6 respectively, are specific examples of the information recording medium 1.

Figure 4:
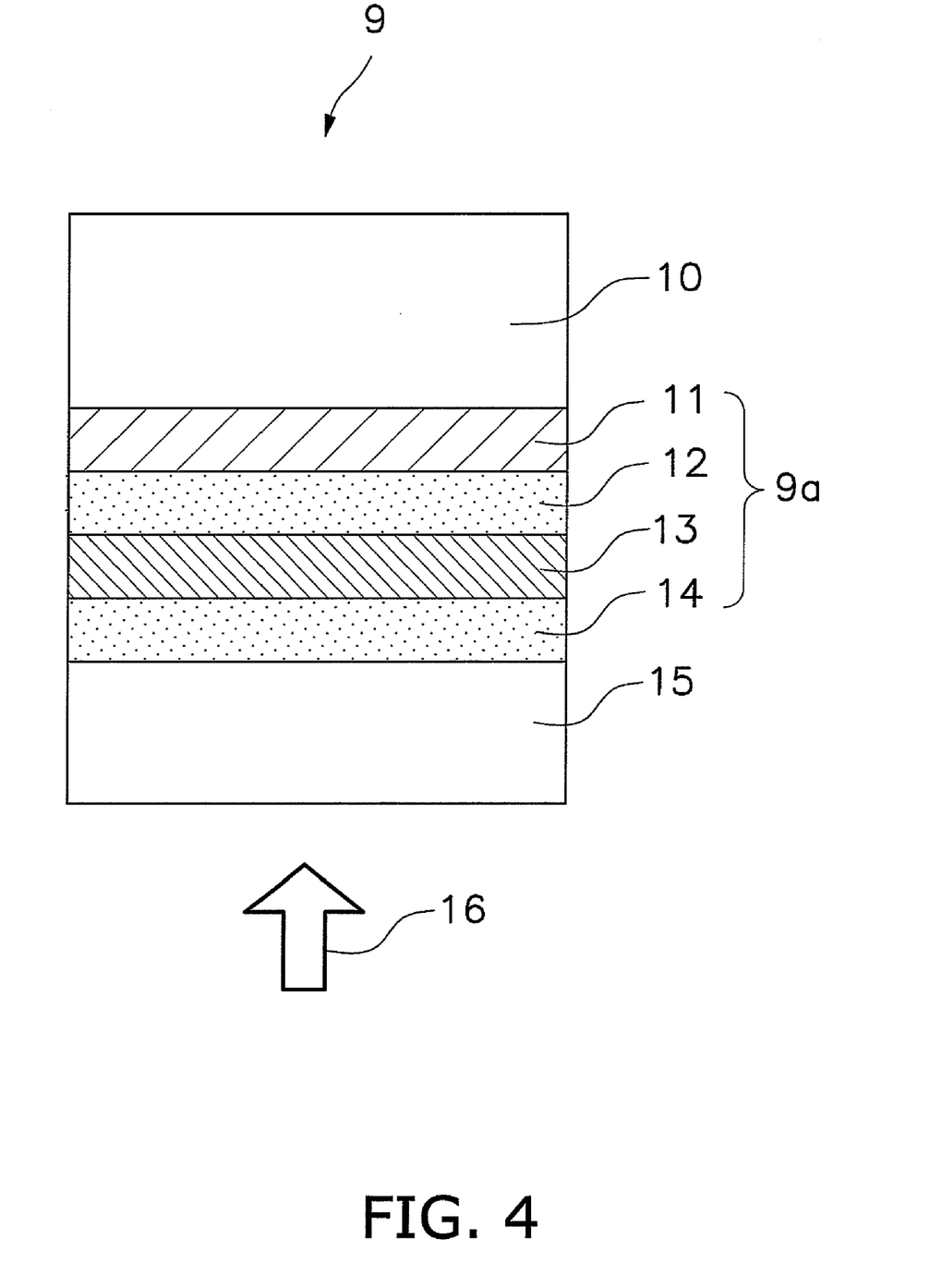
FIG. 4 is a cross-section illustrating an exemplary configuration of an information recording medium.

As shown in FIG. 4, the information recording medium 9 includes a substrate 10, an information layer 9a, and a transparent layer 15. The information layer 9a includes a reflective layer 11, a first dielectric layer 12, a recording layer 13, and a second dielectric layer 14. The reflective layer 11, the first dielectric layer 12, the recording layer 13, and the second dielectric layer 14 are layered upon the substrate 10 in that order. The transparent layer 15 is formed upon the information layer 9a. The transparent layer 15 is also sometimes called a cover layer or a protective layer.

In the information recording medium 9, some or all of the reflective layer 11, the first dielectric layer 12, and the second dielectric layer 14 need not be formed. The fewer layers are present, the further the manufacturing cost of the information recording medium 9 can be reduced. A laser beam 16 records and reproduces a signal by irradiating the information recording medium 9 from the side of the transparent layer 15.

Figure 5:
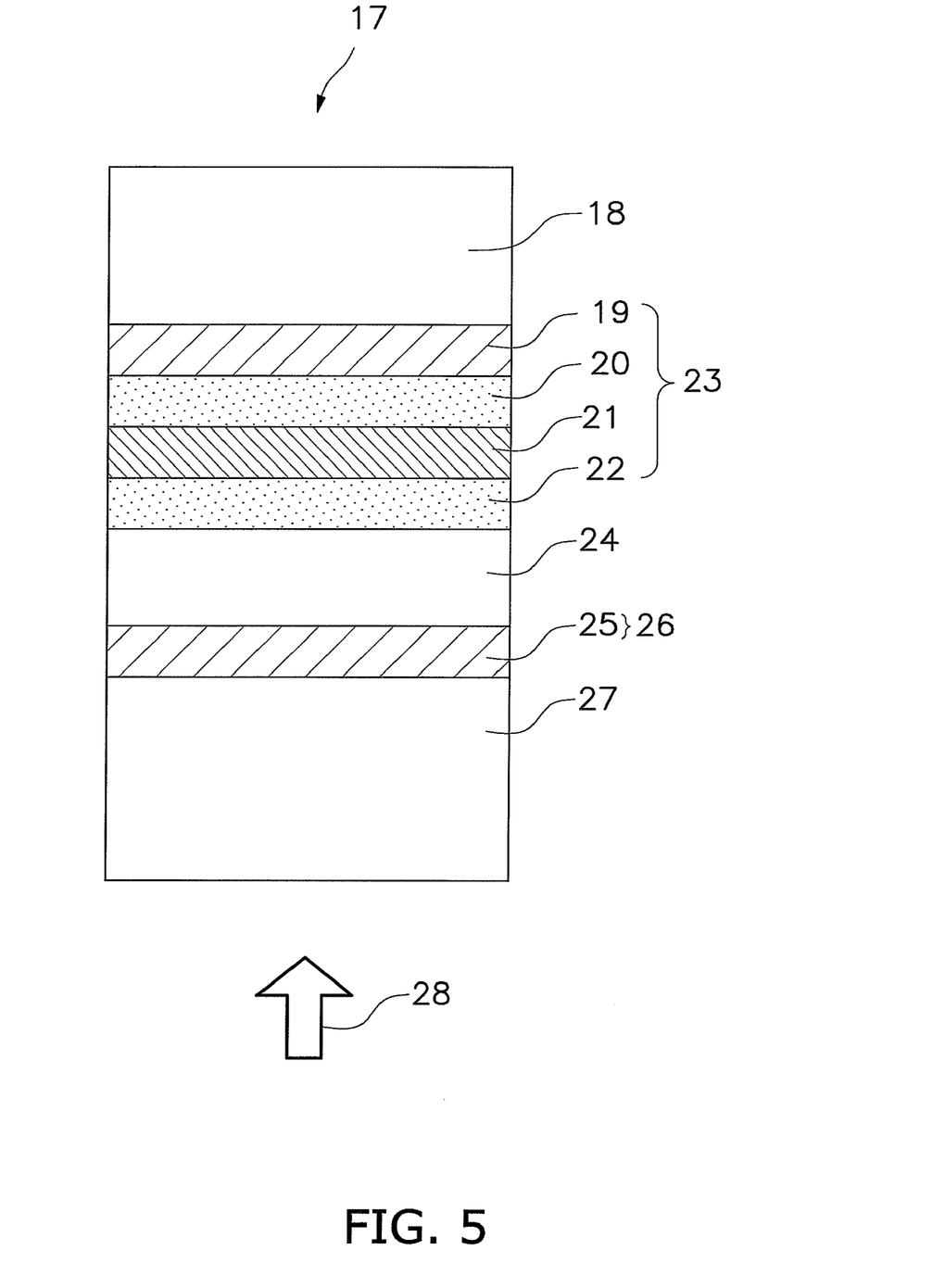
FIG. 5 is a cross-section illustrating another exemplary configuration of an information recording medium.

Meanwhile, as shown in FIG. 5, the information recording medium 17 includes a substrate 18, a first information layer 23, a spacer layer 24, a second information layer 26, and a transparent layer 27. The first information layer 23, the spacer layer 24, the second information layer 26, and the transparent layer 27 are layered upon the substrate 18 in that order.

The first information layer 23 includes a reflective layer 19, a first dielectric layer 20, a recording layer 21, and a second dielectric layer 22. The reflective layer 19, the first dielectric layer 20, the recording layer 21, and the second dielectric layer 22 are layered upon the substrate 18 in that order. Through this configuration, the first information layer 23 is capable of achieving both a high reflectance and signal reproduction stability over a long period of time.

The spacer layer 24 is located between the two information layers 23 and 26, thereby optically separating the information layers from each other. The spacer layer 24 therefore eliminates unwanted optical interference.

The second information layer 26 is composed of a reflective layer 25.

The transparent layer 27 is formed upon the second information layer 26. A laser beam 28 records and reproduces a signal by irradiating the information recording medium 17 from the side of the transparent layer 27.

In the information recording medium 17, some or all of the reflective layer 19, the first dielectric layer 20, and the second dielectric layer 22 in the first information layer 23 need not be formed. The fewer layers are present, the further the manufacturing cost of the information recording medium 17 can be reduced. Furthermore, the first information layer 23 may be composed of only a reflective layer, and the second information layer 26 may have a reflective layer, a first dielectric layer, a recording layer, a second dielectric layer, and so on.

Figure 6:
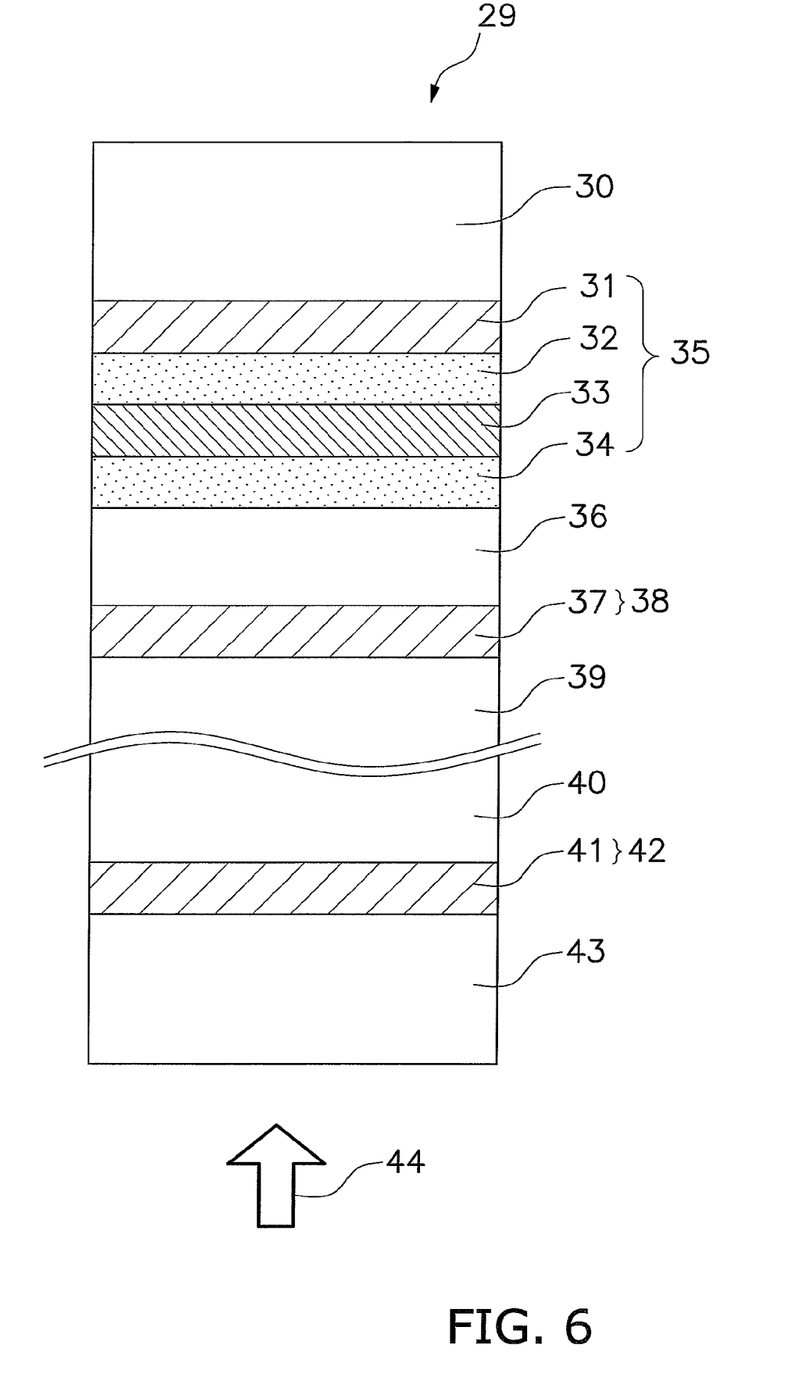
FIG. 6 is a cross-section illustrating yet another exemplary configuration of an information recording medium.

Meanwhile, as shown in FIG. 6, the information recording medium 29 includes a substrate 30, a first information layer 35, a second information layer 38, and so on up to an nth information layer 42 (where n is an integer of 3 or more). The first information layer 35, the second information layer 38, and so on up to the nth information layer 42 are provided in that order upon the substrate 30.

Spacer layers ("36", "39", and "40" in FIG. 6) are located between each of the information layers. The spacer layers eliminate unwanted optical interference by optically separating the information layers from each other.

Furthermore, the nth information layer 42 in the information recording medium 29 is provided with a transparent layer 43. A signal is recorded and reproduced by irradiating the information recording medium 29 from the side of the transparent layer 43 using laser light 44.

The first information layer 35 is configured by layering a reflective layer 31, a first dielectric layer 32, a recording layer 33, and a second dielectric layer 34 in sequence. This configuration achieves both high reflectance and signal reproduction stability over a long period of time.

The second to nth information layers ("38", "42", and so on in FIG. 6) are each composed of reflective layers ("37", "41", and so on in FIG. 6).

In information recording medium 29, some or all of the reflective layer, the first dielectric layer, and the second dielectric layer in the first information layer 35 need not be formed. Furthermore, the first information layer 35 may be composed of only a reflective layer, and at least one of the second to nth information layers may have a reflective layer, a first dielectric layer, a recording layer, a second dielectric layer, and so on. The fewer layers are present, the further the manufacturing cost of the information recording medium 29 can be reduced.

A transparent disk-shaped material, such as those listed below, is used as the material of the substrates 10, 18, and 30 (these reference numerals may be omitted hereinafter):

(1) polycarbonate resin; polymethyl methacrylate resin; polyolefin resin; norbornene resin; ultraviolet curable resin; or glass; or (2) an appropriate combination of the materials included in the above (1).

Concavo-convex marks are formed in the substrate in advance.

Furthermore, while the thickness of the substrate is not particularly limited, the substrate may be, for example, approximately 0.01 mm to 1.5 mm thick. In the case where the numerical aperture of an objective lens is within the range of 0.75 to 0.95, it is preferable for the substrate to be within the range of 1.00 mm to 1.20 mm thick. Having a substrate with a thickness in this range ensures the strength of the information recording medium. Meanwhile, in the case where the numerical aperture of the objective lens is within the range from 0.55 to 0.75, it is preferable for the substrate to be within the range of 0.50 mm to 0.70 mm thick.

Any material can be used as the material for the transparent layers 15, 27, and 43 (these reference numerals may be omitted hereinafter) as long as that material allows laser beams 16, 28, and 44 (these reference numerals may be omitted hereinafter) to pass through at a degree that allows the recording and reproduction of a signal. In other words, it is preferable for the material of the transparent layer to have a low light absorption relative to the wavelength of the laser beam, and for the birefringence to be optically low in the short wave range. A transparent material, such as polycarbonate resin, polymethyl methacrylate resin, polyolefin resin, norbornene resin, ultraviolet curable resin, glass, or an appropriate combination thereof is used as the material for the transparent layer. The transparent layer can be formed by forming one of the aforementioned materials into a disk shape.

Meanwhile, the thickness of the transparent layer is not particularly limited and may be, for example, approximately 0.01 mm to 1.5 mm. In the case where the numerical aperture of the objective lens is within the range from 0.75 to 0.95, it is preferable for the thickness of the transparent layer to be within the range of 0.03 mm to 0.20 mm. Having the thickness of the transparent layer in this range increases the amount of tilt that is permissible in the information recording medium. In the case where the numerical aperture of the objective lens is within the range of 0.55 to 0.75, it is preferable for the thickness of the transparent layer to be 0.50 mm to 0.70 mm.

As with the transparent layer, a transparent material such as polycarbonate resin, polymethyl methacrylate resin, polyolefin resin, norbornene resin, ultraviolet curable resin, glass, or an appropriate combination thereof is used as the material of the spacer layers 24, 36, 39, and 40 (these reference numerals may be omitted hereinafter). The spacer layers can be formed by forming the aforementioned materials into a disk shape.

The spacer layers are formed at a thickness greater than or equal to the focal depth determined by the numerical aperture NA of the objective lens and the wavelength λ of the laser light. Setting the thickness of the spacer layers in such a manner suppresses crosstalk from other information layers when recording information to or reproducing information from one of the first information layers 23 and 35, the second information layers 26 and 38, and the other information layers (for example, the nth information layer 42). The layers are also formed at thicknesses so that all information layers fall within a range in which the laser light can be concentrated thereupon. When layering three or more information layers, it is preferable for the thicknesses of the spacer layers located between two information layers to differ from each other. The reason for this is that the information layers will be disposed at equal intervals if the multiple spacer layers are of the same thickness, and thus when recording information to or reproducing information from one of the information layers, the laser light will focus upon the layer located two layers in front of that information layer, leading to the possibility of an increase in crosstalk.

It is preferable for concavo-convex marks to be formed in the spacer layers as well in advance, on the side on which the information layer is located.

The recording layers 13, 21, and 33 (these reference numerals may be omitted hereinafter) are composed of a material that can take on two or more states having different optical properties. For a material used for a write-once recording layer, it is preferable for this change between different states to be irreversible.

As the recording layer material, for example, a material containing Te, O, and M (where M is at least one element selected from a group consisting of Pd, Au, Pt, Ag, Cu, and Ni) is used. Using at least one element selected from a group consisting of Pd, Au, Pt, Ag, Cu, and Ni as the material M realizes a particularly sufficient crystallization speed and high reproduction durability.

It is preferable for the element M to be an element in which recording marks can be formed in a stable state of crystallization when combined with Te. Elements that can form a chemical or eutectic compound with Te, such as, for example, Pd, Au, Pt, Ag, Cu, and Ni, can be given as examples of such an element. Other elements may be added to the recording layer in order to further improve the properties thereof.

Te—O-M is a composite material that, immediately after the formation of the recording layer, is in a state in which Te, Te-M, and M microparticles are uniformly distributed throughout $TeO_2$. Upon being irradiated with laser light, the particle diameters of the Te and Te-M crystals within this composite material increase. A recording and reproduction apparatus (mentioned later) can detect such differences in the optical state as signals. Therefore, an information recording medium whose recording layers contain Te—O-M can realize the functions of a write-once recording medium capable of being written to only once.

A preferable compositional range for the recording layer material has a Te atomic content of no less than 10 and no more than 65 atomic %, an O atomic content of no less than 20 and no more than 75 atomic %, and an M atomic content of no less than 1 and no more than 30 atomic %. The reasons that such a compositional range is preferable shall be described hereinafter.

Having the Te atoms within the recording layer at no less than 10 atomic % can realize an effect whereby the reflectance of the added marks does not easily decrease even under laser irradiation. Meanwhile, having the Te atoms within the recording layer at no more than 65 atomic % makes the overall reflectance of the recording layer comparatively higher, thereby making the reflectance of the information recording medium comparatively higher as well. As a result, the amount of light reflected by the information recording medium can be high enough for signal reproduction even in the case where dust or the like adheres to the information recording medium. It is further preferable for the percentage of Te atoms contained in the recording layer to be no less than 20 and no more than 50 atomic %.

Having the O atoms within the recording layer at no less than 20 atomic % can make the thermal conductivity of the recording layer comparatively lower, thereby decreasing the thermal diffusivity in the surface direction of the recording layer. Therefore, the width of the added marks can be reduced. As a result, the reproduction accuracy of the concavo-convex marks above the added marks or in the vicinity of the added marks can be improved. Meanwhile, by having the O atoms in the recording layer at no more than 75 atomic %, the signal can be stably reproduced over a long period of time. It is further preferable for the percentage of O atoms contained in the recording layer to be no less than 40 atomic % and no more than 65 atomic %.

By having the M atoms in the recording layer at no less than 1 atomic %, the signal can be stably reproduced over at long period of time. Meanwhile, having the M atoms in the recording layer at no more than 30 atomic % can make the thermal conductivity of the recording layer comparatively lower, thereby decreasing the thermal diffusivity in the surface direction of the recording layer; the width of the added marks can be therefore reduced. As a result, the reproduction accuracy of the concavo-convex marks can be improved. It is further preferable for the percentage of M atoms contained in the recording layer to be no less than 1 atomic % and no more than 20 atomic %.

The recording layer may contain other elements aside from Te, O, and M. For example, at least one type of element selected from among S, N, F, B and C may be added for the purpose of at least one of adjusting the thermal conductivity, adjusting the optical constant, improving the thermal resistance, and improving the environmental reliability. It is preferable for the added amount of these added elements to be within 20 atomic % of the overall recording layer. To rephrase, it is preferable for the total amount of Te atoms, O atoms, and M atoms contained within the recording layer to be no less than 80 atomic %.

It is preferable for the recording layer to be no less than 2 nm and no more than 60 nm thick. Having the recording layer be no less than 2 nm thick makes the amount of change in the reflectance sufficiently high. Meanwhile, having the recording layer be no more than 60 nm thick makes the reflectance comparatively higher, and therefore the amount of light reflected from the information recording medium is high enough for signal reproduction even in the case where dust or the like has adhered to the information recording medium. It is further preferable for the recording layer to be no more than 40 nm thick. Having the recording layer be no more than 40 nm thick reduces the amount of time required for the formation of the recording layer, thereby improving the manufacturability.

Providing the first dielectric layers 12, 20, and 32 and the second dielectric layers 14, 22, and 34 (hereinafter, when there is no particular need to distinguish between these layers, the reference numerals may be omitted and the layers referred to simply as "dielectric layers") makes it possible to protect the recording material, and also makes it possible to adjust the optical properties whereby the effective absorption of light is possible in the information layers.

It is preferable to use, as the material for the dielectric layers, a material that contains, as the primary component, at least one selected from a group consisting of sulfide materials, selenide materials, oxide materials, nitride materials, nitride oxide materials, carbide materials, and fluoride materials.

To be more specific, it is preferable to use a material whose primary component is one of the following as the dielectric layers:

(1) a sulfide such as ZnS;
(2) a selenide such as ZnSe;
(3) an oxide such as $SiO_2$, $Al_2O_3$, $TiO_2$, $Ta_2O_5 ZrO_2$, $Cr_2O_3$, $Nb_2O_5$, $Bi_2O_3$, or $Bi_4Ti_3O_{12}$;
(4) a nitride such as Ge—N, $Si_3N_4$, or AlN;
(5) a nitride oxide such as Ge—O—N, Cr—O—N, Si—O—N, Al—O—N, Nb—O—N, Mo—O—N, Ti—O—N, Zr—O—N, or Ta—O—N;
(6) a carbide such as SiC or a fluoride such as $AlF_3$, $CaF_2$, or $LaF_3$;
(7) or an appropriate combination of the above (1) through (6) (for example, $ZnS$—$SiO_2$ or the like).

These materials may also be combined as appropriate.

Note that in the present specification, "primary component" refers to a percentage of that material contained of no less than 60 atomic %; more preferably, no less than 70 atomic %; still more preferably, no less than 80 atomic %; and even more preferably, no less than 90 atomic %.

It is preferable for the dielectric layers to be no less than 2 nm and no more than 100 nm thick. Having the thicknesses of the dielectric layers within this range realizes an information recording medium having a reflectance sufficient for implementing stable signal reproduction. Meanwhile, it is further preferable for the dielectric layers to be no more than 50 nm thick. Having the thicknesses of the dielectric layers be no more than 50 nm shortens the time required for the formation of the dielectric layers, improving the manufacturability.

Providing the reflective layers 11, 19, 25, 31, 37, and 41 (these reference numerals may be omitted hereinafter) realizes thermal effects such as heat dissipation effects, optical effects such as effective light absorption in the recording layers, and so on.

It is preferable to use, as the material for the reflective layers, a metal such as Ag, Al, Au, Cu, Ni, Cr, or Ti, or an alloy composed of a combination of two or more of these metals. An Ag alloy or an Al alloy are particularly preferable for the material of the reflective layers. Furthermore, from the particular standpoint of heat dissipation and humidity resistance, it is favorable to use Ag—Pd—Cu, Ag—Ga—Cu, Ag—Bi, Al—Cr, or Al—Ni as the material for the reflective layers.

It is preferable for the reflective layers to be no less than 5 nm and no more than 200 nm thick. Having the reflective layers at no less than 5 nm makes it easier to form the reflective layers as uniform layers. Having the reflective layers as uniform layers increases the aforementioned thermal and optical effects. Meanwhile, having the reflective layers at no more than 200 nm shortens the amount of time required to form the reflective layers, improving the manufacturability. When using an Ag alloy for the reflective layers, it is preferable for the reflective layers to be no more than 100 nm thick. Having the reflective layers at no more than 100 nm makes it possible to reduce the amount of Ag, which is an expensive precious metal, that is used, and thus preferable from the standpoint of costs.

Preferable ranges for the refraction index n and the attenuation coefficient k of the material used for the reflective layers are less than 2.0 and greater than or equal to 2.0, respectively.

Note that the configuration of the information recording medium is not limited to the configurations illustrated in FIG. 4, FIG. 5, and FIG. 6. For example, the information recording medium may have a configuration that does not include the reflective layers 11, 19, 25, 31, 37, and 41, in order to avoid an increase in costs, and may have a configuration that does not include the first dielectric layers 12, 20, and 32 or the second dielectric layers 14, 22, and 34.

For example, the configuration of the information recording medium 17 shown in FIG. 5 can be changed to a configuration that does not include the first dielectric layer 20. Furthermore, the configuration of the information recording medium 29 shown in FIG. 6 can be changed to a configuration that does not include the reflective layer 31 within the first information layer 35. Eliminating dielectric layers and/or reflective layers from the information recording medium reduces the manufacturing cost of that information recording medium.

2. Information Recording Medium Manufacturing Method

The method for manufacturing the information recording medium described thus far may include a step of forming an information layer upon a substrate.

Vapor-phase thin film deposition, for example, can be given as a method for forming the layers (films) contained in the information layers; more specifically, vacuum deposition, sputtering, ion plating, CVD (Chemical Vapor Deposition), MBE (Molecular Beam Epitaxy), or the like can be given as such a method.

A specific manufacturing method for the information recording media 9, 17, and 29 shall be described below.

<<Manufacturing Method for Information Recording Medium 9>>

The manufacturing method for the information recording medium 9 shown in FIG. 4 includes a step of forming an information layer upon the substrate 10. The information recording medium 9 can be manufactured using a method that includes the following steps (1) and (2):

(1) a step of forming the reflective layer 11, the first dielectric layer 12, the recording layer 13, and the second dielectric layer 14 in that order upon the substrate 10, thereby forming the information layer 9a; and (2) a step of forming the transparent layer 15 upon the information layer 9a, or in other words, upon the second dielectric layer 14.

The following can be given as methods for forming the transparent layer 15:

(i) a method of forming the layer by bonding an information recording medium that has been manufactured as far as the second dielectric layer 14 to a backing having an adhesive resin on one side;
(ii) a method of forming the layer by bonding an information recording medium that has been manufactured as far as the second dielectric layer 14 to a sheet-shaped backing using a UV curable resin; or
(iii) a method of forming the layer by dropping an ultraviolet curable resin onto an information recording medium that has been manufactured as far as the second dielectric layer 14 and then hardening the resin using ultraviolet rays.

<<Manufacturing Method for Information Recording Medium 17>>

The information recording medium 17 shown in FIG. 5 can be manufactured using a manufacturing method that includes, for example, the following steps (1) through (4):
(1) a step of forming the first information layer 23 upon the substrate 18 using the same method as that used to form the information layer 9a of the information recording medium 9 shown in FIG. 4;
(2) a step of forming the spacer layer 24 upon the information layer 23;
(3) a step of forming the second information layer 26 (that is, the reflective layer 25) upon the spacer layer 24; and
(4) a step of forming the transparent layer 27 upon the second information layer 26 using the same method as that used to form the transparent layer 15 of the information recording medium 9.

<<Manufacturing Method for Information Recording Medium 29>>

The information recording medium 29 shown in FIG. 6 can be manufactured using a manufacturing method that includes, for example, the following steps (1) through (3):
(1) a step of forming a first information layer 35 upon the substrate 30 using the same method as that used for the information layer of the information recording medium 9 shown in FIG. 4;
(2) steps of forming second to nth information layers and spacer layers disposed between the information layers, carried out by repeatedly alternating a step of forming a spacer layer upon a kth information layer (where k is an integer no less than 1 and no more than (n−1)) and a step of forming a (k+1)th information layer (that is, a reflective layer) upon that spacer layer; and
(3) a step of forming the transparent layer 43 upon the nth information layer 42.

<<Method for Forming Recording Layers>>

One of the following methods (1) through (3), for example, can be used in the formation of the aforementioned recording layers.
(1) A method of manufacturing recording layers through sputtering, the method using, as the target material used in the step of manufacturing the recording layer, a material whose primary components are Te, O, and M (where M is at least one element selected from a group consisting of Pd, Au, Pt, Ag, Cu, and Ni).
(2) The method described in the above (1), where the sputtering is a reactive sputtering, the target material uses Te and M (where M is at least one element selected from a group consisting of Pd, Au, Pt, Ag, Cu, and Ni) as its primary component, and the sputtering gas has a mixture of a noble gas and oxygen as its primary component.
(3) The method described in the above (1) or (2), where Te and M (where M is at least one element selected from a group consisting of Pd, Au, Pt, Ag, Cu, and Ni) and $TeO_2$ are sputtered simultaneously from different targets.

Forming recording layers using one of these methods makes it possible to realize an information recording medium having such properties as those described in the aforementioned sections 1-2 and 1-3 (reflectance and modulation degree). In other words, any of these methods makes it possible to prevent the unauthorized copying of the recording medium without sacrificing the recording area for data, and makes it possible to realize an information recording medium capable of stable signal reproduction over a long period of time.

<<Method for Manufacturing Substrate>>

A specific example of a method for manufacturing a substrate shall be described hereinafter.

First, a glass master disk that has been coated with a photoresistant material is exposed to a laser or electron beam based on authored content data (cutting). After this, the exposed resistant material is dissolved in developer by performing a developing process, thereby forming concavo-convex marks. A master disk on which content data has been developed as concavo-convex marks is manufactured in this manner.

Next, a stamper is formed by plating one of the surfaces of the master disk, or in other words, the surface in which the concavo-convex marks are formed.

Then, a substrate onto which the concavo-convex marks have been transferred is manufactured through the injection molding of a material such as a transparent resin using this stamper.

<<Process for Forming Spacer Layers>>

In the method for manufacturing the information recording medium 17, the process for forming the spacer layer 24 may be, for example, the following processes (1) or (2).
(1) A process of forming the spacer layer 24 by bonding a resin film in which concavo-convex marks are formed onto the first information layer 23 formed upon the substrate 18.
(2) A process of forming the spacer layer 24 with concavo-convex marks formed therein by coating the first information layer 23 with an ultraviolet curable resin and pressing the ultraviolet curable resin with the stamper while irradiating the resin with ultraviolet rays.

The processes for forming the multiple spacer layers in the information recording medium 29 are the same.

3. Recording and Reproduction Apparatus and Recording and Reproduction Method for the Information Recording Medium FIG. 7 illustrates an outline of the recording and reproduction apparatus 45, serving as an example of an apparatus used in the recording/reproduction of an optical disk.

As shown in FIG. 7, the recording and reproduction apparatus 45 is provided with: an optical head (not shown) that includes a laser 49 and an objective lens 48; a driving unit (not shown) for guiding the irradiation position of a laser beam 47 from the laser 49 to a predetermined position; a tracking control unit (not shown) that controls the irradiation position of the laser light in the track direction; a focusing control unit (not shown) that controls the irradiation position of the laser light in the direction that is vertical to the surface of an optical disk 46; a laser driving unit (not shown) for modulating the laser power; and a spindle motor 51 for rotating the optical disk 46.

The information recording medium 1, or more specifically, the information recording media and 9, 17, and 29, can be used favorably as the optical disk 46. The laser beam 47 corresponds to the laser beams 16, 28, and 44.

The recording and reproduction apparatus 45 records and reproduces a signal by irradiating the optical disk 46 with the laser beam 47 that has been concentrated into a minute spot by an optical member such as a lens 48 while rotating the optical disk 46 using the spindle motor 51.

During signal reproduction, the laser driving unit (not shown) adjusts the power level of the laser 49 to a lower power level than that used when recording a signal. The laser driving unit also adjusts the power level of the laser 49 so as not to be influenced by the optical state of the recording marks as a result of the laser irradiation, and so that an amount of light sufficient for the reproduction of the recording marks from the optical disk 46 can be obtained through laser irradiation. The recording and reproduction apparatus 45 can reproduce a signal recorded onto the optical disk 46 by a photodetector 50 reading the light reflected from the optical disk 46 obtained in this manner.

It is preferable for the wavelength of the laser light used in recording and reproduction to be no less than 350 nm and no more than 500 nm. High-density recording in which 25 GB can be recorded to a single layer of an information recording medium having a diameter of 12 cm can be realized by using laser light having a wavelength of 405 nm and a lens having an NA of 0.85. High-density recording in which 15 GB can be recorded to a single layer of an information recording medium having a diameter of 12 cm can be realized by using laser light having a wavelength of 405 nm and a lens having an NA of 0.65.

WORKING EXAMPLES

Working Examples shall be described next.

A. Working Example 1

In Working Example 1, the influence of the composition of the recording layer on the following items was investigated when Te—O—Pd was used as the recording material:
(a) reflectance;
(b) reproduction durability;
(c) polarity of the change in the reflectance due to laser irradiation; and
(d) reproduction accuracy of the concavo-convex marks.
As shall be described hereinafter, in Working Example 1, multiple information recording media having recording layers of different compositions were manufactured as samples and evaluated. Details thereof shall be described hereinafter.

A-1. Manufacture of Samples

The layer composition of the samples manufactured in the present working example and Working Example 2, described later, are the same as that of the information recording medium 9 shown in FIG. 4, with the exception that the first dielectric layer 12 is not contained therein. In the following descriptions, the layers contained in each sample shall be described using the reference numerals of FIG. 4.

A substrate composed of a polycarbonate resin was used as the substrate 10. The substrate 10 had a diameter of 12 cm and a thickness of 1.1 mm, and had concavo-convex marks in one of its surfaces.

An 80 nm-thick Ag—Bi layer was formed, as the reflective layer 11, through sputtering using an Ag—Bi target (atomic ratio 99.0:1.0), on the surface of the substrate 10 in which the concavo-convex marks were formed.

Next, a Te—O—Pd layer was formed upon the reflective layer 11 as the recording layer 13 through sputtering, using a Te—Pd target. The thickness of the recording layer 13 differed depending on the sample, and was selected in accordance with the composition of the recording layer 13 so as to secure a reflectance that allows stable recording and reproduction.

Then, a ZnS—SiO$_2$ layer was formed as the second dielectric layer 14 through sputtering, using a ZnS—SiO$_2$ (molecular ratio 80:20) target. The thickness of the second dielectric layer 14 differed depending on the sample, and was selected in accordance with the composition of the recording layer so as to secure reflectance that allows stable recording and reproduction.

The surface of the second dielectric layer 14 was then coated, through spin coating, with an ultraviolet curable resin (acrylic resin) transparent to laser light. This ultraviolet curable resin was then hardened through irradiation with ultraviolet rays, thereby forming a light-transparent layer 15 with a thickness of 100 μm.

A sputtering target approximately 100 mm in diameter and 6 mm thick was used in the formation of all the layers. The power sources and outputs used in the formation processes for each of the layers were as described hereinafter. For the reflective layer 11, a DC power source was used as the power source, and the output thereof was 200 W; for the recording layer 13, a DC power source was used as the power source, and the output thereof was 50 W; and for the second dielectric layer 14, an RF power source was used as the power source, and the output thereof was 400 W. Meanwhile, the formation of the reflective layer 11 and the second dielectric layer 14 of Zn—SiO$_2$ was carried out in an Ar 25 sccm gas atmosphere with the gas pressure held at approximately 0.13 Pa. The formation of the recording layer 13 was carried out in an Ar 25 sccm and oxygen mixed gas atmosphere with the gas pressure held at approximately 0.13 Pa. Furthermore, the formation of the recording layer in each sample was carried out using multiple sputtering targets composed of Te and Pd, with mutually different content rates thereof, and while altering the amount of oxygen supplied, in order to obtain recording layers having the compositions indicated in Table 1.

Thirteen samples (Nos. 1 through 13) of information recording media having recording layers of different compositions were manufactured through the aforementioned process. The manufacture of the samples in Working Example 1 was completed in this manner.

A-2. Evaluation

Next, the method for evaluating the samples shall be described.

The following evaluations were performed in a general recording and reproduction apparatus 45 as illustrated in FIG. 7, using the samples No. 1 through 13 as the optical disk 46.

A semiconductor laser having a wavelength of 405 nm was used as the laser 49, and an objective lens having a numerical aperture of 0.85 was used as the objective lens 48. The linear speed at which the optical disk 46 (samples No. 1 through 13) was rotated was 4.92 m/s (36 Mbps, equivalent to 1×BD speed).

[a. Evaluation of Reflectance]

The reflectance was evaluated through the following procedure. The reflectance was measured by irradiating the optical disk 46 with a laser beam using the aforementioned recording and reproduction apparatus, measuring the amount of light reflected by the optical disk 46, and calculating the ratio of the amount of reflected light to the amount of irradiated laser light. Here, a reflectance of 12% or more was evaluated as "○", whereas a reflectance of less than 12% was considered to be an insufficient reflectance and was thus evaluated as "x".

[b. Evaluation of Reproduction Durability]

The reproduction durability was evaluated through the following procedure. First, the average jitter of concavo-convex marks consisting of mark lengths 2T to 8T (where T corresponds to one cycle of the clock of the recorded data) was premeasured using the aforementioned recording and reproduction apparatus 45. Next, the track measured earlier was irradiated with reproduction light continuously for 1 million rotations at BD 1× speed, in an environment where the reproduction light was 0.35 mW. The jitter value of that track was then measured following the reproduction durability experiment. Here, a jitter degradation of 0.2% or less was evaluated as "○", whereas a jitter degradation of more than 0.2% was evaluated as "x". Furthermore, a jitter degradation of 0.1% or less was evaluated as "⊚".

[c. Evaluation of Polarity of Reflectance Change]

The polarity of the reflectance change was evaluated based on the following criteria. When an added mark was recorded through laser radiation, if the post-recording reflectance increased compared to the pre-recording reflectance, the evaluation was "○", whereas if the reflectance decreased, the evaluation was "x".

[d. Evaluation of Reproduction Accuracy of Concavo-Convex Marks]

The reproduction accuracy of the concavo-convex marks was evaluated through the following procedure. The average jitter of the concavo-convex marks originally formed was first measured using the aforementioned recording and reproduction apparatus.

Next, added marks were formed upon the concavo-convex marks through laser irradiation, and the average jitter of the concavo-convex marks was measured.

Here, a jitter degradation in the concavo-convex marks following the formation of the added marks of 0.2% or less was evaluated as "○", whereas a jitter degradation of more than 0.2% was evaluated as "x".

[e. Measurement of Content of Each Atom in Recording Layer]

Next, the method for measuring the content of each atom within the recording layer shall be described. The content of the elements that compose the recording layer in each of the samples No. 1 through 13 was measured having separately created a sample for composition analysis. To be more specific, multiple targets having different Te and M contents as used in the formation of the recording layers in the samples No. 1 through 13 were prepared, and 500 nm-thick films were formed upon 1 mm thick Si substrates using a sputtering device. The conditions for forming the films were the same as the conditions employed when forming the recording layers in the samples No. 1 through 13.

Next, the compositions of the films were analyzed using an x-ray microanalyzer. The material compositions indicated in the working examples are the results of the analysis performed through this method.

[f. Overall Evaluation]

An overall evaluation was carried out whereby if, in the evaluation results for the reflectance, reproduction durability, polarity of the reflectance change, and reproduction accuracy of the concavo-convex marks as described above, even a single "x" was present in a sample, that sample was evaluated as "x"; if all items were evaluated as "○", then that sample was evaluated as "○"; and if the evaluation result for the reproduction durability was "⊚" and the rest of the evaluation results were "○", then that sample was evaluated as "⊚".

The aforementioned evaluation was carried out for the information recording media manufactured in Working Example 1. The results thereof are illustrated in Table 1.

TABLE 1

| Sample No. | XMA Composition (at %) | | | Reflectance | Reproduction Durability | Polarity of Reflectance Change | Reproduction Accuracy of Concavo-Convex Marks | Overall Evaluation |
| --- | --- | --- | --- | --- | --- | --- | --- | --- |
| | Te | O | Pd | | | | | |
| 1 | 40 | 50 | 10 | ○ | ⊚ | ○ | ○ | ⊚ |
| 2 | 20 | 70 | 10 | ○ | ○ | ○ | ○ | ○ |
| 3 | 14 | 63 | 23 | ○ | ○ | ○ | ○ | ○ |
| 4 | 34 | 43 | 23 | ○ | ○ | ○ | ○ | ○ |
| 5 | 54 | 23 | 23 | ○ | ○ | ○ | ○ | ○ |
| 6 | 60 | 30 | 10 | ○ | ○ | ○ | ○ | ○ |
| 7 | 45 | 55 | 0 | ○ | X | ○ | ○ | X |
| 8 | 15 | 80 | 5 | ○ | X | ○ | ○ | X |
| 9 | 6 | 67 | 27 | ○ | ○ | X | ○ | X |
| 10 | 28 | 36 | 36 | ○ | ○ | ○ | X | X |
| 11 | 56 | 17 | 27 | ○ | ○ | ○ | X | X |
| 12 | 70 | 25 | 5 | X | ○ | ○ | ○ | X |
| 13 | 30 | 60 | 10 | ○ | ⊚ | ○ | ○ | ⊚ |

As shown in Table 1, the evaluation results of the reflectance, reproduction durability, polarity of the change in reflectance due to laser irradiation, and reproduction accuracy of the concavo-convex marks in samples whose recording layers are composed of Te—O—Pd materials differ depending on the composition of the recording layer. According to Table 1, a Te amount in the range of less than 10 atomic % within the recording layer causes the reflectance of the added marks to decrease due to laser irradiation, which is problematic in terms of practical application. Meanwhile, when the Te amount within the recording layer exceeds 65 atomic %, the reflectance decreases, leading to a decrease in the amount of reflected light when dust or the like adheres to the surface of the medium, which is problematic in terms of practical application.

If the O amount within the recording layer is less than 20 atomic %, the thermal conductivity of the recording layer is high, increasing the thermal diffusivity in the surface direction of the recording layer, and widening the width of the added marks. As a result, the reproduction accuracy of the concavo-convex marks drops in regions with added marks, which is problematic in terms of practical application. Meanwhile, if the O amount within the recording layer is greater than 75 atomic %, the signal cannot be stably reproduced over a long period of time, which is problematic in terms of practical application.

If the Pd amount within the recording layer is less than 1 atomic %, the signal cannot be stably reproduced over a long period of time, which is problematic in terms of practical application. Meanwhile, if the Pd amount is greater than 30 atomic %, the thermal conductivity of the recording layer is high, increasing the thermal diffusion in the surface direction of the recording layer, and widening the width of the added marks. The reproduction accuracy of the concavo-convex marks drops as a result, which is problematic in terms of practical application.

The samples No. 1 and No. 13 particularly excel in terms of reproduction durability, and thus have an overall evaluation of "⊚".

Figure 8:
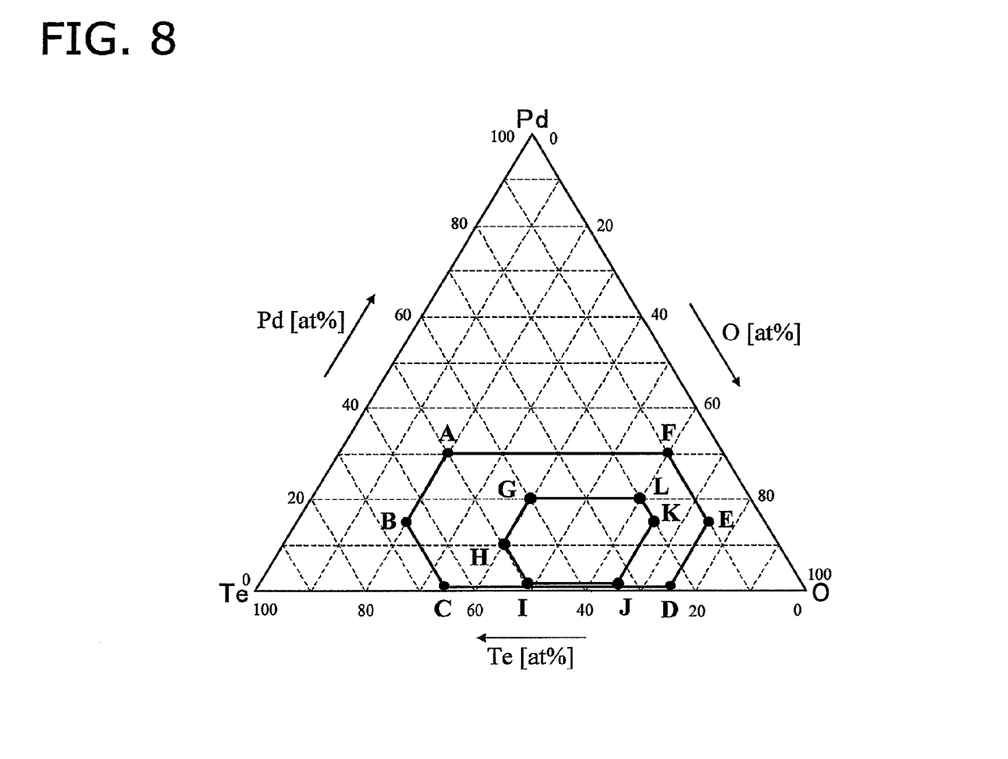
FIG. 8 is a phase diagram of a Te—O—Pd ternary system.

Therefore, when taking into consideration the reflectance, the reproduction durability, polarity of the reflectance change due to laser irradiation, and the reproduction accuracy of the concavo-convex marks, it is thought that a suitable compositional range in the recording layer is one in which the percentage of Te atoms is no less than 10 atomic % and no more than 65 atomic %, the percentage of O atoms is no less than 20 atomic % and no more than 75 atomic %, and the percentage of Pd atoms is no less than 1 atomic % and no more than 30 atomic %. This range is indicated in FIG. 8 by the region surrounded by A, B, C, D, E, and F.

From the same standpoint, it is considered further preferable for, in the recording layer, the percentage of Te atoms to be no less than 20 atomic % and no more than 50 atomic %, the percentage of O atoms to be no less than 40 atomic % and no more than 65 atomic %, and the content of M atoms to be no less than 1 atomic % and no more than 20 atomic %. This range is indicated in FIG. 8 by the region surrounded by G, H, I, J, K, and L.

Although the example described here uses Pd for the material M, it was confirmed that the same properties could be obtained when using Au, Pt, Ag, Cu, and Ni.

According to the present working example, it was confirmed that an information recording medium having main information such as video, audio, and the like and furthermore being capable of having sub information added thereto at a low cost can be realized by having, in the recording layer thereof, a percentage of Te atoms no less than 10 atomic % and no more than 65 atomic %, a percentage of O atoms no less than 20 atomic % and no more than 75 atomic %, and a percentage of M atoms (where M is Pd, Au, Pt, Ag, Cu, and Ni) of no less than 1 atomic % and no more than 30 atomic %.

From the same standpoint, it was confirmed that it is further preferable for the recording layer to have a percentage of Te atoms no less than 20 atomic % and no more than 50 atomic %, a percentage of O atoms of no less than 40 atomic % and no more than 65 atomic %, and a content of M atoms of no less than 1 atomic % and no more than 20 atomic %.

B. Working Example 2

In Working Example 2, in order to investigate the reproduction stability of the marks, the signal quality of the added marks and the reproduction accuracy of the concavo-convex marks were evaluated for each of information recording media serving as samples while changing the ratio of the pre-laser irradiation reflectance Ra to the post-laser irradiation reflectance Rb.

In the present working example, the information recording media manufactured as samples were, as described above, identical to the information recording medium 9 shown in FIG. 4, except that the first dielectric layer 12 was not included therein. Aside from differing thicknesses for the second dielectric layers 14, the samples of the present working example (No. 14 through 19) have identical configurations.

Note that the pre-laser irradiation reflectance Ra is the reflectance prior to added marks being formed upon the concavo-convex marks, whereas the post-laser irradiation reflectance Rb is the reflectance after the added marks have been formed upon the concavo-convex marks. The thickness of the second dielectric layer 14 in each sample was adjusted so as to obtain the Rb/Ra values shown in Table 2. The method for measuring the reflectance is the same as that described in Working Example 1.

The method for manufacturing the samples, the method for analyzing the recording layer compositions, and the method for evaluating the reproduction accuracy of the concavo-convex marks were the same as those described in Working Example 1. The composition of the recording layers used in the present working example was Te:O:Pd=40:50:10 [at %].

The signal quality of the added marks was evaluated in the following manner.

[Evaluation of Signal Quality of the Added Marks]

The average jitter of the added marks was measured using the recording and reproduction apparatus used in Working Example 1. If, as a result of the measurement, the average jitter was less than 10%, the evaluation was "○", whereas if the average jitter was 10% or more, the evaluation was "x".

The evaluation results of the samples manufactured in Working Example 2 are indicated in Table 2.

TABLE 2

| Sample No. | Rb/Ra | Signal Quality of Added Marks | Reproduction Accuracy of Concavo-Convex Marks |
|---|---|---|---|
| 14 | 1 | x | ○ |
| 15 | 1.03 | ○ | ○ |
| 16 | 1.05 | ○ | ○ |
| 17 | 1.07 | ○ | ○ |
| 18 | 1.1 | ○ | Δ |
| 19 | 1.2 | ○ | x |

As shown in Table 2, it can be seen that the signal quality of the added marks is favorable in a range where Rb/Ra>1.0. Furthermore, it can be seen that the reproduction accuracy of the concavo-convex marks is favorable in a range where Rb/Ra<1.1.

According to the present working example, it was confirmed that the added marks and concavo-convex marks of an information recording medium can be stably reproduced by the pre-laser irradiation reflectance Ra and the post-laser irradiation reflectance Rb fulfilling the relationship 1.0<Rb/Ra<1.1.

C. Working Example 3

In Working Example 3, the recording layers of an information recording medium having two information layers were composed of a Te—O—M material (here, a Te—O—Pd material is used as a representative example), and, similar to Working Example 1, the influence of the recording layer composition upon the reflectance, reproduction durability, polarity of the reflectance change due to laser irradiation, and reproduction accuracy of the concavo-convex marks was investigated.

The layer compositions of the samples manufactured in the present working example were the same as those of the information recording medium 17 shown in FIG. 5, except that the first dielectric layer 20 was not included. Hereinafter, a substrate composed of polycarbonate resin was used, in the layers contained in each sample, as the substrate 18. The substrate 18 had a diameter of 12 cm and the thickness of 1.1 mm, and had concavo-convex marks in one of its surfaces.

An 80 nm-thick Ag—Bi layer was formed, as the reflective layer 19, upon the surface of the substrate 18 in which the concavo-convex marks were formed, through sputtering using an Ag—Bi (atomic ratio 99.0:1.0) target.

Next, a Te—O—Pd layer was formed, as the recording layer 21, upon the reflective layer 19, through sputtering using a Te—Pd target. The thickness of the recording layer 21 differed depending upon the sample. The thickness of the recording layer 21 in each sample was selected based on the composition of the recording layer 21 so as to secure a reflectance whereby recording and reproduction could be carried out in a stable manner.

Next, a ZnS—SiO2 layer was formed as the second dielectric layer 22 through sputtering, using a ZnS—SiO$_2$ (molecular ratio 80:20) target. The thickness of the second dielectric layer 22 differed depending on the sample. The thickness of the second dielectric layer 22 in each sample was selected in accordance with the composition of the recording layer in each sample so as to secure a reflectance that allows stable recording and reproduction.

of the recording layer 21 was carried out in an Ar 25 sccm and oxygen mixed gas atmosphere with the gas pressure held at approximately 0.13 Pa.

Furthermore, the formation of the recording layer 21 in each sample was carried out using multiple sputtering targets composed of Te and Pd, with mutually different content rates thereof, and while altering the amount of oxygen supplied, in order to obtain recording layers having the compositions indicated in Table 3. The manufacture of the samples in Working Example 3 was thus completed.

The method for analyzing the recording layer compositions and the methods for evaluating the reflectance, reproduction durability, polarity of the reflectance change due to laser irradiation, and reproduction accuracy of the concavo-convex marks were the same as those described in Working Example 1. Furthermore, the method of overall evaluation was the same as that described in Working Example 1. The evaluation results for the information recording media manufactured in Working Example 3 are indicated in Table 3.

TABLE 3

| Sample No. | XMA Composition (at %) | | | Reflectance | Reproduction Durability | Polarity of Reflectance Change | Reproduction Accuracy of Concavo-Convex Marks | Overall Evaluation |
|---|---|---|---|---|---|---|---|---|
| | Te | O | Pd | | | | | |
| 20 | 40 | 50 | 10 | ○ | ◉ | ○ | ○ | ◉ |
| 21 | 20 | 70 | 10 | ○ | ○ | ○ | ○ | ○ |
| 22 | 14 | 63 | 23 | ○ | ○ | ○ | ○ | ○ |
| 23 | 34 | 43 | 23 | ○ | ○ | ○ | ○ | ○ |
| 24 | 54 | 23 | 23 | ○ | ○ | ○ | ○ | ○ |
| 25 | 60 | 30 | 10 | ○ | ○ | ○ | ○ | ○ |
| 26 | 45 | 55 | 0 | ○ | X | ○ | ○ | X |
| 27 | 15 | 80 | 5 | ○ | X | ○ | ○ | X |
| 28 | 6 | 67 | 27 | ○ | ○ | X | ○ | X |
| 29 | 28 | 36 | 36 | ○ | ○ | ○ | X | X |
| 30 | 56 | 17 | 27 | ○ | ○ | ○ | X | X |
| 31 | 70 | 25 | 5 | X | ○ | ○ | ○ | X |
| 32 | 30 | 60 | 10 | ○ | ◉ | ○ | ○ | ◉ |

The surface of the first information layer 23 formed in this manner was then coated, through spin coating, with an ultraviolet curable resin (acrylic resin). Then, a pattern in which was formed the same marks as the concavo-convex marks formed in the substrate 18 was transferred onto this ultraviolet curable resin, thereby forming the spacer layer 24 having a thickness of approximately 25 μm.

A 15 nm-thick Ag—Bi layer was then formed, as the second information layer 26 (reflective layer 25), upon the surface of the spacer layer 24, through sputtering using an Ag—Bi (atomic ratio 99.0:1.0) target. A light-transmissive layer 27 approximately 75 μm thick was then formed upon the surface of the second information layer 26 using an ultraviolet curable resin (acrylic resin).

A target approximately 100 mm in diameter and 6 mm thick was used in the formation of all of the layers. The power sources and outputs used in the formation processes for each of the layers are as described hereinafter. For the reflective layers 19 and 25, a DC power source was used as the power source, and the output thereof was 200 W; for the recording layer 21, a DC power source was used as the power source, and the output thereof was 50 W; and for the second dielectric layer 22, an RF power source was used as the power source, and the output thereof was 400 W. Meanwhile, the formation of the reflective layers 19 and 25 and the second dielectric layer 22 was carried out in an Ar 25 sccm gas atmosphere with the gas pressure held at approximately 0.13 Pa. The formation As indicated in Table 3, it can be seen that, as in Working Example 1, a favorable reflectance, reproduction durability, polarity of reflectance change due to laser irradiation, and reproduction accuracy of the concavo-convex marks can be obtained by using a Te—O—Pd recording material for the recording layer in the first information layer.

In particular, the samples having a recording layer with the same composition as that in the samples No. 1 and No. 13 in Working Example 1 (No. 20 and No. 32) particularly excelled in reproduction durability, and thus had an overall evaluation of "◉".

Although the example described here uses Pd for the material M, it was confirmed that the same properties could be obtained when using Au, Pt, Ag, Cu, and Ni.

According to the present working example, it was confirmed that an information recording medium having main information such as video, audio, and the like and furthermore being capable of having sub information added thereto at a low cost can be realized by having, in the recording layer thereof, a percentage of Te atoms no less than 10 atomic % and no more than 65 atomic %, a percentage of O atoms no less than 20 atomic % and no more than 75 atomic %, and a percentage of M atoms (where M is at least one element selected from a group consisting of Pd, Au, Pt, Ag, Cu, and Ni) of no less than 1 atomic % and no more than 30 atomic %.

From the same standpoint, it was confirmed that it is further preferable for the recording layer to have a percentage of Te atoms no less than 20 atomic % and no more than 50 atomic %, a percentage of O atoms of no less than 40 atomic % and no more than 65 atomic %, and a content of M atoms of no less than 1 atomic % and no more than 20 atomic %.

INDUSTRIAL APPLICABILITY

The information recording medium and method of manufacture thereof according to the present invention is useful in an information recording medium (optical disk or the like) having main information such as video, audio, or the like and to which sub information can further be added at a low cost.

| EXPLANATION OF REFERENCE | |
|---|---|
| 1, 9, 17, 29, 46 | information recording medium |
| 2 | lead-out area |
| 3 | data recording area |
| 4 | lead-in area |
| 5, 7 | concavo-convex mark |
| 6, 8 | added mark |
| 10, 18, 30 | substrate |
| 11, 19, 25, 31, 37, 41 | reflective layer |
| 12, 20, 32 | first dielectric layer |
| 13, 21, 33 | recording layer |
| 14, 22, 34 | second dielectric layer |
| 15, 27, 43 | light-transmissive layer |
| 24, 36, 39, 40 | spacer layer |
| 16, 28, 44, 47 | laser beam |
| 23, 35 | first information layer |
| 26, 38 | second information layer |
| 42 | nth information layer |
| 45 | recording and reproduction apparatus |
| 48 | objective lens |
| 49 | laser |
| 50 | photodetector |
| 51 | spindle motor |

The invention claimed is:

1. An information recording medium comprising the following (1) through (3):
   (1) an information layer in which concavo-convex marks are formed; and
   (2) a recording layer, contained within the information layer, in which added marks are formed by optical properties changing through laser irradiation, and that contains Te, O, and M (where M is at least one element selected from a group consisting of Pd, Au, Pt, Ag, Cu, and Ni); and
   (3) a substrate on which the information layer is disposed; wherein a pre-laser irradiation reflectance Ra and a post-laser irradiation reflectance Rb fulfill $1.0 < Rb/Ra < 1.1$.

2. The information recording medium according to claim 1, wherein the shortest distance between adjacent added marks is longer than the longest distance between adjacent concavo-convex marks; and
   the length of the shortest added mark is longer than the length of the longest concavo-convex mark.

3. The information recording medium according to claim 1, wherein when the total of the number of Te atoms, O atoms, and M atoms contained in the recording layer is taken as 100 atomic %,
   the content percentage of Te atoms is no less than 10 atomic % and no more than 65 atomic %;
   the content percentage of O atoms is no less than 20 atomic % and no more than 75 atomic %; and
   the content percentage of M atoms is no less than 1 atomic % and no more than 30 atomic %.

4. The information recording medium according to claim 1, wherein when the total of the number of Te atoms, O atoms, and M atoms contained in the recording layer is taken as 100 atomic %,
   the content percentage of Te atoms is no less than 20 atomic % and no more than 50 atomic %;
   the content percentage of O atoms is no less than 40 atomic % and no more than 65 atomic %; and
   the content percentage of M atoms is no less than 1 atomic % and no more than 20 atomic %.

5. The information recording medium according to claim 1, wherein when the total number of atoms that compose the recording layer is taken as 100 atomic %,
   the total of the number of Te atoms, O atoms, and M atoms contained in the recording layer is no less than 80 atomic %.

6. The information recording medium according to claim 1, wherein the information layer includes a dielectric layer adjacent to the recording layer; and
   the dielectric layer contains, as its primary component, at least one item selected from a group consisting of a sulfide material, a selenide material, an oxide material, a nitride material, a nitride oxide material, a carbide material, and a fluoride material.

7. The information recording medium according to claim 1, wherein the information layer includes a dielectric layer adjacent to the recording layer; and
   the thickness of the dielectric layer is no less than 2 nm and no more than 100 nm.

8. The information recording medium according to claim 1, wherein the information layer includes a dielectric layer adjacent to the recording layer; and
   the thickness of the dielectric layer is no less than 2 nm and no more than 50 nm.

9. The information recording medium according to claim 1, wherein the information layer includes a reflective layer disposed between the substrate and the recording layer; and
   the reflective layer contains, as its primary component, at least one element selected from a group consisting of Ag, Al, Au, Cu, Ni, Cr, and Ti.

10. The information recording medium according to claims 1, wherein the information layer includes a reflective layer disposed between the substrate and the recording layer; and
    the thickness of the reflective layer is no less than 5 nm and no more than 200 nm.

11. The information recording medium according to claim 1, wherein the thickness of the recording layer is no less than 2 nm and no more than 60 nm.

12. The information recording medium according to claim 1, wherein the thickness of the recording layer is no less than 2 nm and no more than 40 nm.

13. A method of manufacturing an information recording medium according to claim 1, the method comprising:

forming the recording layer directly upon the substrate or upon another layer that is formed upon the substrate, using a sputtering target that contains Te, O, and M (where M is at least one element selected from a group consisting of Pd, Au, Pt, Ag, Cu, and Ni).

14. A method of manufacturing an information recording medium according to claim 1, the method comprising:

forming, through reactive sputtering, the recording layer directly upon the substrate or upon another layer that is formed upon the substrate, using a sputtering target that contains Te and M (where M is at least one element selected from a group consisting of Pd, Au, Pt, Ag, Cu, and Ni), within a mixed gas atmosphere that contains a noble gas and oxygen.

* * * * *